UNITED STATES PATENT OFFICE 2,636,101

ARC WELDING ELECTRODE

Leland A. De Pue, Takoma Park, Md.

No Drawing. Application September 7, 1949,
Serial No. 114,451

1 Claim. (Cl. 219—8)

(Granted under Title 35, U. S. Code (1952),
sec. 266)

This invention relates to arc-welding electrodes and particularly to an electrode for the welding of copper-base alloys such as bronzes and brasses.

Although the art of welding of non-ferrous metals has progressed rapidly in recent years, it is universally recognized that many problems remain unsolved in this field. Thus, there are certain widely used non-ferrous metal alloys which are difficult or impossible to weld satisfactorily. That is, in such a way as to produce a welded unit having physical properties commensurate with those of a cast or wrought unit.

An example of such a material is the copper-zinc-tin series of alloys variously known as zinc bronzes, Government bronze, Admiralty gun metal and commonly referred to as "G-bronze." A typical composition is: 88% Cu, 8% Sn and 4% Zn. This class of alloys is widely used because of their excellent combination of properties of strength, ductility, castability, bearing qualities and resistances to sea water corrosion. The minimum acceptable mechanical properties are a 40,000 p. s. i. tensile strength and a 20% elongation in two inches. Heretofore it has not been possible to attain these properties in a welded joint of this material.

Thus, it is the object of this invention to provide a welding electrode for the welding of G-bronze.

It is another object to provide such an electrode as can also be used to weld other copper-base alloys with improved results.

It is a still further object to provide a welding electrode which will require no coating to shield the arc, and may be used without a protective inert atmosphere.

It is still another object to provide such an electrode as will produce a weldment substantially free from entrapped slag inclusions.

Accordingly, this invention comprises an electrode containing a critical quantity of phosphorus alloyed in copper or a copper-base alloy.

The alloying elements present in the said copper-base alloy should, in general, correspond qualitatively and quantitatively with those in the metal to be welded, i. e. the "plate" composition, except as to phosphorus which is controlled by different considerations, and except as to zinc which is to be omitted entirely from the electrode composition. Thus, it is seen that a feature of this electrode is the absence of zinc even though the electrode is to be used for welding zinc bearing castings. The high volatility of zinc causes its presence in the electrode to result in zinc oxide powder being deposited on the plate ahead of the weld with resulting lack of proper fusion.

The range of phosphorus content is quite narrow and is very critical. It must be between 0.25% and 0.5%. If the phosphorus content is any higher the resulting weldment will not have the specified ductility. In fact, both ductility and strength drop off sharply with above 0.5% phosphorus in the electrode. The lower limit, on the other hand, is not determined by the direct effect of phosphorus on physical properties (i. e. as an alloying element) but rather by its effect on the metal-transfer properties of the arc. This, of course will strongly affect the metallurgical quality of the weldment and thus its mechanical properties.

It may be pointed out that certain prior art welding rods have utilized phosphorus as an alloying element as well as deoxidizer and have specified a relatively large range suitable for this purpose. The relation of phosphorus content of the electrode to transfer properties of the arc, however, has not heretofore been realized. This relationship was graphically demonstrated in the instant investigation by observing the fluctuation in arc voltage during welding. A pen-recording voltmeter was used to record the arc voltage continually during welding with the electrode of this invention and comparing it with that obtained under the same conditions with a commercial Phosphor bronze electrode having lower phosphorus content, and also with an aluminum bronze electrode containing little or no phosphorus. These curves indicate the fluctuation through a given range of arc voltage (10 volts) is about five to ten times more frequent with the commercial electrodes than with that having the critical phosphorus content prescribed by this invention.

This difference in arc characteristics is reflected in the mechanical properties of the resultant welded joint. As a specific example, an electrode of this invention containing 0.41% phosphorus produced a welded "G" bronze unit having an average tensile strength of 41,400 p. s. i., yield strength, 21,000 p. s. i. and elongation of 21% (in 2 inches). The commercial Phosphor bronze electrode of nearest composition, analyzing at 0.20% phosphorus, has been found to give a weld having an average tensile strength of 32,000 p. s. i. and elongation averaging around 11%.

Another feature of this invention lies in the fact that this electrode is used without a coating of any kind, and without an inert gas atmosphere. The test results set out above were obtained from welding done in normal atmosphere. The function of the shielding coating or the inert atmosphere is believed to be fulfilled by vaporized phosphorus. Prior to my invention all previous Phosphor bronze electrodes have required a coating (metallic or non-metallic) which often is more expensive than the rod itself. Further, as is well known in the welding art, the use of a coated electrode often gives rise to slag inclusions in the weld deposit, particularly in welding high heat conductivity metals where the weld puddle is molten for only a short period of time not sufficient to allow all the slag to float or be fluxed out to the surface. It is felt therefore that an important contribution has been made in the form of an uncoated electrode for the welding of copper-base alloys.

The composition of the copper-base material with which the phosphorus is alloyed in this invention is, in general, approximately that of the plate composition, with the exception that it contains no zinc. The absent zinc is preferably replaced equally, percentagewise, by copper and tin. The degree of precision with which this formula is carried out will be determined by the color match desired. The electrode content of highly color-affecting metals like tin must correspond rather closely to the plate content if good color match is desired, but may vary within a wide range without affecting mechanical properties of the weld. A typical electrode used for many welds in this investigation (and particularly, for welding 88-8-4 G-bronze) had a nominal composition of 90% Cu-10% Sn plus 0.4% phosphorus, the phosphorus being critical. In the welding of similar alloys containing nickel, lead, aluminum, etc., these additions were also added to the electrode in roughly commensurate quantities. Again, the role they play is not critical.

It must be pointed out that although the electrode of this invention was developed primarily to solve the problem of welding the G-bronze composition, it has been tested and found successful in the welding of other copper-base alloys which are also known to be difficult to weld. Thus, an aluminum bronze (91% Cu, 1.6% Sn, 6% Al, 0.6% Fe, and 0.8% Si) was made up (the aluminum being deliberately inordinately high to increase difficulty of welding) and successfully welded with this electrode. Similarly a high nickel "bronze" (88% Cu, 3% Zn, 3% Sn, 1% Pb, 5% Ni) was welded successfully with this electrode by an operator with no previous experience with the rod.

It will be understood that the foregoing examples are merely illustrative and that the invention is to be limited only by the herewith appended claim.

The invention described herein may be manufactured and used by or for the Government of the United States of America for governmental purposes without the payment of any royalties thereon or therefor.

What is claimed is:

An uncoated arc welding electrode formed of a zinc-free alloy which consists essentially of about 10% tin, between about 0.4 and 0.41% phosphorus, and the balance copper.

LELAND A. DE PUE.

References Cited in the file of this patent

UNITED STATES PATENTS

| Number | Name | Date |
|---|---|---|
| 1,103,482 | Canzler et al. | July 14, 1914 |
| 1,681,904 | Pipes | Aug. 21, 1928 |
| 1,867,111 | Spence | July 12, 1932 |
| 2,009,977 | Wilkins | July 30, 1935 |

OTHER REFERENCES

Campbell, American Society for Testing Materials, Proceedings 1922, vol. 22, pp. 220, 222.

Welding Encyclopedia, 12th Edition, 1947, pages 190, 193.

Welding Handbook, 1942, pages 857, 868.